United States Patent Office 2,695,839
Patented Nov. 30, 1954

2,695,839

METHOD AND COMPOSITIONS FOR KILLING WEEDS

John W. Kenney, Jr., Long Beach, and Joseph W. Girard, Hermosa Beach, Calif., assignors to Great Lakes Carbon Corporation, New York, N. Y., a corporation of Delaware No Drawing. Application November 21, 1951, Serial No. 257,646

16 Claims. (Cl. 71—2.4)

This invention relates to methods of killing weeds in an active state of growth and to novel compositions useful in such methods.

Various types of weed killers have been proposed and are currently in use. These materials are characterized by their ability to attack or exterminate certain undesirable species of vegetation, their action being selective in that desirable species are left substantially unaffected and in a more or less healthy or vigorous state. The weed killing agents which have been used include both organic and inorganic chemicals or compositions, some of the more common materials being described in U. S. Patents 2,220,505, 2,129,598–601, 2,284,002, 2,297,904 and 2,322,761. Examples of inorganic weed killing agents which have previously been employed include ammonium sulfamate, sodium chlorate, alkali metal bromates and iodates, alkali metal bisulphites, alkali metal chlorides, etc.

The usual method of applying herbicidal agents of the type described above involves dissolving the agent in an appropriate solvent, such as water, kerosene, fuel oil, etc. and applying the resulting solution, usually in the form of a spray, to the area desired to be treated. Alternatively, the herbicidal agent may be dry-mixed with a pulverulent diluent such as talc, finely divided diatomaceous earth, fuller's earth, whiting, etc., and applying the resulting active dusts to the areas to be treated. While these methods are suitable for application at close range and where there is no danger of contamination of adjacent areas in which certain vegetation might be damaged, in numerous applications there has always been a distinct hazard in that particles of active spray or dust may be carried over on to adjacent areas under cultivation with harmful effects due either to the method of application or to the fact that the particles of active agent are miscarried by wind or air currents. Progress in the application of herbicidal agents by aircraft has been retarded because of the difficulties just mentioned. Attempts have been made to solve this problem by incorporating the herbicidal agents into or upon pellets consisting essentially of fuller's earth, natural clays, or other pelletized powders. While such pellets lend themselves to controlled distribution by aircraft over a designated area, they leave much to be desired in that the bonding agents employed during the pelletizing operation are usually water-soluble. The pellets are therefore adversely affected by rainfall or conditions of high humidity which conditions cause slacking and progresisve disintegration of the pellets. During periods of reduced humidity or drought, the resulting disintegrating pellets form dusts which may be picked up by prevailing winds thereby causing damage to adjacent areas where the presence of such agents would be undesirable. Furthermore, the disintegration of such pellets accelerates the release of the herbicidal agents and the effective life or period of activity of the pelleted compositions is thereby substantially reduced. In addition to the foregoing the cost of pelletizing fine powders is relatively expensive and in many cases economically prohibitive. The cost of the final herbicidal compositions is from two or three times that of the novel compositions described and claimed herein.

It is an object of this invention to provide novel effective herbicidal agents having improved properties with respect to length of active service, resistance to abrasion, and disintegration due to climatic conditions.

It is a further object of the invention to provide novel methods for the application of herbicidal agents wherein the amount and extent of application of such agents is subject to close control by the applicator.

The above objects as well as others which will become apparent from the invention as described herein are realized by exposing the foliage of weeds to a composition comprising essentially calcined diatomaceous earth aggregate which is impregnated with herbicidal agent, the aggregate having a minimum particle size of about +30 mesh (U. S. Standard Series) and being further characterized by its resistance to abrasion, crushing and to slacking when wet by water. We have found that the novel compositions described and claimed herein can be applied to large agricultural areas by aircraft as well as by more conventional means while maintaining close control over said application with respect to the area being covered and the concentration of agent per unit area being treated.

The calcined diatomaceous earth aggregate which is employed as the carrier in our novel compositions is first calcined, for example in a rotary kiln which is internally fired, at a temperature between about 1200° and about 2000° F., preferably between 1750° to 2000° F. in order to obtain maximum resistance to abrasion. This is highly important to prevent dusting of the final herbicidal agent during handling and application. This renders the aggregate not only resistant to abrasion but also improves its water absorption properties which is essential in order to achieve substantially uniform impregnation of the aggregate with a solution of herbicidal agent. In addition, calcination of the aggregate in the aforementioned temperature range improves the crushing strength and resistance to slacking by the action of water or water vapor. Methods of measuring or controlling the aforementioned desirable properties will be subsequently described herein.

The novel herbicidal compositions described herein may be applied to fields where the desired and undesirable vegetation are in a relatively advanced state of growth. Alternatively, and in some cases a preferred procedure, application is made on a cultivated, newly seeded area so that as the weeds emerge from the soil they are brought under control directly while the desired plants grow normally.

Numerous herbicidal agents and mixtures thereof may be incorporated into the calcined diatomaceous earth aggregate, the nature of the agent selected being governed by the type of weed which is to be controlled. Of most general effectiveness are the arylcarboxylic acid compounds of the type mentioned in the above enumerated patents. Included in the term "compounds" are the free acids and their esters and salts. Compounds which have been found to be effective include the phenyl, naphthyl, anthracene and tetra-aryl mono-carboxylic acid, their esters and salts. The aryl portions of the compounds may contain substituents such as halogen, hydroxyl, nitro or alkyl or alkoxy groups such as methyl, ethyl, propyl, butyl, naphthoxy and ethoxy. Also included among the herbicidal agents contemplated herein are aryl substituted aliphatic acids having 1–9 carbon atoms; for example, aryl substituted propionic, acetic, butyric and acrylic acids.

The term "esters" is broad enough to cover the esters corresponding to both the saturated and unsaturated alcohols. As examples of suitable esters may be mentioned the alkyl and alkylene esters such as methyl, ethyl, propyl, butyl, amyl, octyl, lauryl, oleyl, allyl, and isoprene esters, the esters of polyhydroxy alcohols such as the esters of ethylene glycol and of the polyethylene glycols, and the aralkyl esters such as the benzyl esters.

The polyethylene glycol ester of a desired acid may be made by heating a polyethylene glycol, such as Carbowax of molecular weight of 600 or over, with the arylcarboxylic acid in the presence of a catalyst such as sulphuric acid.

The term "salts" is broad enough to include the alkali and alkaline earth salts such as sodium, potassium, lithium, ammonium, magnesium, calcium, the acid salts such as the sodium and potassium acid salts, the salts of other metals such as copper and iron, and the substituted organic ammonium salts such as the salts of methylamine, trimethylamine, diethylamine, monoethanolamine, triethanolamine and isopropanolamine.

The following is a representative list of compounds which have been found to be suitable for the purposes of this invention.

Benzoic acid, its halogen and nitro substitution products such as 2,4-dichloro-benzoic acid, 2,5-dichlorobenzoic acid, 3,5-dichloro-benzoic acid, 2,3,5-triiodo benzoic acid, 2-chloro-5-nitrobenzoic acid and 2-bromo-3-nitrobenzoic acid, and the esters and salts of said acids.

Phenyl acetic acid, its halogen substitution products such as 2-chloro-phenyl acetic acid, 4-chloro-phenyl acetic acid, 4-bromo-phenyl acetic acid, and 4-iodo-phenyl acetic acid, and the esters and salts of said acids.

Phenyl-alpha and gamma butyric acid, and their various derivatives, particularly 4-chlorophenyl-alpha and gamma butyric acids, and the esters and salts of said acids.

Naphthalene-1-acetic acid, its alkyl substitution products such as 2-methyl-naphthyl-1-acetic acid and 1-methyl-naphthyl-1-acetic acid, the halogen substitution products such as 4-chloronaphthyl-1-acetic acid, the nitro-substitution derivatives such as 4-nitro-naphthyl-1-acetic acid and the esters and salts of said acids are suitable.

1-naphthalene-alpha-propionic acid, 1-naphthalene, beta-propionic acid, 1-naphthalene-gamma-butyric acid, their halogen substitution products, 1-naphthoic acid, 2-naphthoic acid, their halogen substitution products, tetralyl-6-acetic acid, anthracyl-acetic acid, its halogen substitution products, and the esters and salts of the foregoing compounds.

We also contemplate the use of inorganic herbicidal agents including ammonium sulfamate, sodium bisulphite, sodium chlorate alkali metal bromates and iodates, etc.

In the case of water soluble herbicidal agents, these may be dissolved in an appropriate amount of water and the resulting solution added to the calcined diatomaceous earth aggregate. The amount of water or other solvent preferably employed is that which is sufficient to completely wet or satisfy the absorptive capacity of the calcined aggregate. This results in a substantially uniform impregnation of the aggregate with herbicidal agent. The resulting composition is then dried at a temperature below the decomposition point of the agent and at such a rate as to prevent or minimize migration of the agent to the surface of the aggregate. This results in a herbicidal composition wherein the agent is substantially uniformly distributed throughout the aggregate and which is substantially free from particles of the agent adhering loosely to the outside surfaces of the aggregate and which could be easily removed by abrasion or by the action of aggregate particles moving against each other.

It is also within the contemplation of our invention to employ certain wetting, dispersing or emulsifying agents in the solution employed for impregnating the particles of calcined diatomaceous earth aggregate. This is particularly helpful where the herbicidal agent has a low solubility in water. We may employ commercially available detergents, water dispersion and emulsifying agents of the type listed in Mattiello ("Protective and Decorative Coatings," vol. IV, John Wiley and Sons, New York, 1944). These agents may include the non-ionic type which are not affected by salts, acids or bases.

Sulphonated vegetable oils (e. g. sulphonated castor oil, corn oil, peanut oil, soybean oil, etc.) are examples of ionic agents that we may use. These have certain cost advantage, but being ionic, they have their limitations when used in the presence of acids, bases and salts. When such agents are used, it is advisable to use distilled or soft water for dilution purposes.

Agents of the non-ionic type are preferred. This type of agent will usually dissolve or suspend from 1 to 50% of its volume or weight of the herbicide and the mixture can then be diluted with water to the desired concentration for application to the aggregate. The usual amounts of salts, acids or alkalis apparently have little, if any, effect on the resulting solution or suspension.

A class of non-ionic agents that I have found particularly suitable for the purposes of this invention may be defined as follows:

A water-soluble, non-ionic emulsifying agent containing polyether groups of the formula $R.O(C_2H_4O)n.R_1$, where R is an alkyl, aryl, aralkyl, alkyl-aryl or acyl group of 10 carbon atoms or more, and $R_1$ is an alkyl, aryl, aralkyl, alkyl-aryl, or acyl group or a hydrogen atom, and $n$ is an integer greater than 2 and generally greater than 10.

The amount of herbicidal agent contained in the impregnated diatomaceous earth aggregate may vary considerably but is usually between 0.1–20% by weight of the aggregate (dry basis). The amount of agent will depend upon numerous factors including the vapor pressure and water solubility of the agent, number of impregnations, and the duration of desired effectiveness in the area where the composition is placed for weed control.

The diatomaceous earth to be used as an aggregate in preparing our novel compositions should be moderately hard in the crude state and should have a Gardener-Coleman water absorption factor not substantially below 80% (Gardener Paints, Varnishes, etc., 7th edition, page 541). The crude earth should be calcined at a temperature between 1200°–2000° F. This treatment improves the water absorption characteristics of the earth which facilitates impregnation of the aggregate with solutions of herbicidal agents. For example, diatomaceous earth dried at ordinary temperatures (i. e. up to 250° F.) has a Gardener Coleman-absorption factor of 95% by weight. This is improved by calcination at 1200° F. to 114% by weight, the capacity for water absorption decreasing slowly to 93% for an aggregate calcined at 1800° F.

Since our novel herbicidal agents must be resistant to crushing and abrasion, which would increase the amount of dust (—50 mesh material) during handling and application, calcination of the aggregate at 1200–2000° F. is required to produce maximum strength. For example, very hard raw diatomaceous earth breaks down at 400/410 lbs. per sq. in. when specimens of 20 x 17 x 15 mm. are crushed hydraulically through their center dimensions whereas the calcined material breaks down at 2300/2350 lbs. per sq. in.

Samples of a hard diatomaceous earth before and after calcination at 1500° F. were sized to pass a screen of 0.380" sq. opening and to be retained on a screen of 0.295" opening. A weighed quantity of each sample was placed in a box containing 1" cubes of hard wood, the box being rotated for 15 minutes. The fragments passing a 6 mesh screen (U. S. Standard Series) were weighed as abrasion loss with the following results:

Percent by weight
Abrasion loss raw sample_____ 18
Abrasion loss calcined sample_____ 6

To illustrate the resistance to slacking of the aggregate due to the action of water or water vapor, samples of raw and calcined diatomaceous earth similar to those used in the abrasion tests were placed in a laboratory ball mill placed in a drum and covered with water. The drum was rotated at 42 R. P. M. for five minutes after which any resulting fine particles were washed through a 6 mesh screen, dried and weighed as slacking loss.

Percent by weight
Slacking loss, raw earth_____ 13.6
Slacking loss, calcined sample_____ 0.0

We have found that the impregnation of the calcined diatomaceous earth aggregate with solutions of herbicidal agents, followed by drying to remove the impregnating vehicle, in no way affects the properties of the aggregate regarding strength, abrasion resistance and resistance to slacking.

In a preferred embodiment of the invention, a diatomaceous earth aggregate which had previously been calcined at a temperature of 1750° F., and whose particles fall within the range of —10 +30 mesh (U. S. Standard Series) was mixed with an aqueous solution of the sodium salt of 2,4-dichlorophenoxy acetic acid in the following proportions:

Water _____gal__ 20
Herbicidal agent_____lbs__ 10½
Diatomaceous earth aggregate_____lbs__ 200

The resulting composition was dried at a temperature not in excess of 300° F. until the resulting composition had moisture content less than 2% by weight. The final product was found to contain 99+% of material which was retained on a 30 mesh screen. This composition was applied by an aeroplane to a cultivated, seeded area the plane being flown at a height of 25–50 ft., the applicator being set so as to lay down between 1-3 particles of the herbicidal composition per sq. in. of ground. It was found that due to the particle size, abrasion and crushing resistance, close control could be obtained in restricting the application of the agent to a previously designated area and that the distance traveled by the particles due to prevailing winds could be closely calculated.

The area treated as described above was kept effectively under control for at least three weeks while the desired seedlings continued to thrive. It was found that the particles did not disintegrate due to the action of rainfall or conditions of high humidity. Presumably, the long period of effectiveness of the agent is due to a slow release of the herbicidal agent from the aggregate due to leaching by water vapor or rainfall. No incidence of dust formation was observed and it was therefore possible to insure protection to adjacent areas where presence of the weed killing composition would have proven to be harmful.

In a further embodiment of the invention, a 30 per cent solution of sodium 2,4-dichlorophenoxyethyl sulfate was applied to a —10+30 mesh diatomaceous earth aggregate which had previously been calcined at 1850° F. in an amount so as to leave a 10% residue of the herbicide (dry basis) on the aggregate which was dried at 250° F. to a moisture content of less than 2% by weight. The resulting product was applied by aircraft to a cultivated, seeded area for "pre-emergence" weed control. This treatment was effective for a period of three to four weeks, during which time the desired plants emerged from the soil and grew normally.

In order to further illustrate the invention, the following compositions are set forth as exemplary but not by way of limitation. The diatomaceous earth aggregate has a particle size of —10 +30 mesh and had been calcined to a temperature of 1700-1750° F. The herbicidal agent was dissolved in the designated solvent, the latter being employed in quantity sufficient to satisfy the absorptive capacity of the aggregate. The resulting impregnated compositions were dried at temperatures of 250-300° F. to produce a final agent which was substantially free of the solvent.

Table I exemplifies compositions wherein the agent is soluble in water, the lower aliphatic alcohols or mixtures thereof:

*Table I*

| Example No. | Herbicide | Percent Herbicide by Wt. of Dry Aggregate | Solvent |
|---|---|---|---|
| 1 | 2,4-dichloro-phenoxy acetic acid (2,4-D). | 1.0 | 50:50 mixture by volume of water and denatured alcohol. |
| 2 | do | 5.0 | Do. |
| 3 | 2,4-D sodium salt | 5.0 | Water. |
| 4 | do | 10.0 | Do. |
| 5 | 2,5-dichloro-phenoxy acetic acid (2,5-D). | 5.0 | Denatured alcohol. |
| 6 | 2,5-D ammonium salt | 10.0 | Water. |
| 7 | 2,4-D morpholine salt | 5.0 | Do. |
| 8 | 2,4-D ethanolamine salt | 3.0 | Do. |
| 9 | 2,4,5-trichloro-phenoxy acetic acid. | 5.0 | Denatured alcohol. |
| 10 | 2,4,5-trichloro-phenoxy acetic acid-sodium salt. | 10.0 | Water. |
| 11 | 2,4-dichloro-phenoxy acetic acid-mercury salt. | 5.0 | Ethyl alcohol. |
| 12 | Pentachlorophenol-sodium salt. | 5.0 | Water. |
| 13 | 4,6-dinitro-o-cresylic acid-ammonium and sodium salt. | 2.0 | Do. |
| 14 | Alpha-naphthoxyacetic acid-sodium salt. | 0.5 | Do. |
| 15 | Ammonium trichloro-acetate. | 10.0 | Do. |
| 16 | Gamma-phenoxy-butyric acid. | 5.0 | Acetone. |
| 17 | Potassium Phenyl acetate. | 3.0 | Water. |

Table II exemplifies compositions wherein the herbicidal agent is oil soluble. The final compositions are highly effective for the purpose intended and in some cases the period of activity exceeds that of the activity of the compositions impregnated with the water soluble agents.

*Table II*

| Example No. | Herbicide | Percent Herbicide by Wt. of dry Aggregate | Solvent |
|---|---|---|---|
| 18 | 2,4-dichloro-nitro-benzene | 10.0 | Kerosene. |
| 19 | Furfural | 5.0 | Do. |
| 20 | ethyl N-phenyl-carbonate | 2.0 | Xylene. |
| 21 | isopropyl carbonilate | 1.0 | Acetone. |
| 22 | 3,5-dinitro-o-cresol | 15.0 | Kerosene. |
| 23 | hexachloro-cyclohexane | 7.0 | Toluene. |
| 24 | methoxone | 3.0 | Methyl ethyl ketone. |
| 25 | tetrachloroethane | 5.0 | Toluene. |
| 26 | chloropicrin | 0.5 | Acetone. |
| 27 | 2,4-dinitro-6-sec-butyl phenol | 2.0 | Do. |
| 28 | 1,2,4-dithiazole | 1.0 | Do. |
| 29 | o-dichlorobenzene | 2.0 | Xylene. |

Table III exemplifies a composition wherein the herbicidal agent is mixed with a wetting agent, the resulting composition being added to water as a solvent. This dispersion or emulsion is then added to the calcined diatomaceous earth aggregate, the remaining procedural steps being the same as outlined above:

*Table III*

| Example No. | Herbicide | Wetting Agent | Percent Herbicide by Wt. of dry Aggregate | Percent Wetting Agent by Wt. of Herbicide |
|---|---|---|---|---|
| 30 | Phenyl acetic acid. | polyakylene ether alcohol. | 5.0 | 20.0 |
| 31 | naphthyl - 1 - acetic acid. | sulfonated castor oil. | 5.0 | 10.0 |
| 32 | 2,4-D | sodium lauryl sulfate. | 7.0 | 10.0 |
| 33 | methyl phenylacetate. | polyethylene glycol (Carbowax 400B). | | |

Table IV exemplifies compositions in which the herbicidal agent is inorganic in nature. While such compositions are effective in controlling certain weeds, agriculturists have determined that in general the organic agents, of the type set forth in Tables I–III, are less harmful to the soil and are more widely or more generally applicable.

*Table IV*

| Example No. | Herbicide | Percent Herbicide by Wt. of dry Aggregate | Solvent |
|---|---|---|---|
| 34 | ammonium sulfamate | 10 | Water. |
| 35 | sodium bisulfite | 10 | Do. |
| 36 | sodium chlorate | 8 | Do. |

While the compositions described herein are particularly and admirably adapted to treatment of agricultural areas by means of aircraft, it is to be understood that more conventional methods of application may be employed such as by applying the compositions either by hand or mechanically in close proximity to the vegetation sought to be controlled. In addition, the invention is not limited to the specific compositions set forth herein or to the specific methods disclosed for preparing our novel compositions.

We claim as our invention:

1. A composition for killing growing weeds comprising essentially a calcined diatomaceous earth aggregate impregnated with herbicidal agent, said aggregate having a minimum particle size of about +30 mesh and being resistant to abrasion, crushing and to slacking when wet by water.

2. A composition according to claim 1 wherein the herbicidal agent is an arylcarboxylic acid compound.

3. A composition according to claim 1 wherein the herbicidal agent is material of the group consisting of 2,4- and 2,5-dichlorophenoxy acetic acid, their salts and esters, and mixtures thereof.

4. A composition for killing growing weeds comprising essentially particles of diatomaceous earth which have been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of the sodium salt of 2,4-dichlorophenoxy acetic acid.

5. A composition for kililng growing weeds comprising essentially particles of diatomaceous earth which have been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of 2,4-dichlorophenoxy acetic acid.

6. A composition according to claim 4 wherein the diatomaceous earth particles have been calcined at a temperature of 1750° to 2000° F.

7. A composition according to claim 5 wherein the diatomaceous earth particles have been calcined at a temperature of 1750° to 2000° F.

8. The method of killing weeds in an active state of growth which comprises applying to a weed-containing area a composition comprising essentially a calcined diatomaceous earth aggregate impregnated with herbicidal agent, said aggregate having a minimum particle size of about +30 mesh and being resistant to abrasion crushing and to slacking when wet by water.

9. The method of claim 8 wherein the herbicidal agent is material of the group consisting of 2,4- and 2,5-dichlorophenoxy acetic acid, their salts and esters, and mixtures thereof.

10. The method of killing weeds in an active state of growth which comprises applying to a weed-containing area a composition comprising essentially particles of diatomaceous earth which has been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of the sodium salt of 2,4-dichlorophenoxy acetic acid.

11. The method of killing weeds in an active state of growth which comprises applying to a weed-containing area a composition comprising essentially particles of diatomaceous earth which has been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of 2,4-dichlorophenoxy acetic acid.

12. The method of controlling weed growth in a cultivated, seeded agricultural area which comprises applying to said area prior to the appearance of active vegetative growth an herbicidal composition comprising essentially a calcined diatomaceous earth aggregate impregnated with herbicidal agent, said aggregate having a minimum particle size of about +30 mesh and being resistant to abrasion, crushing and to slacking when wet by water.

13. The method of controlling weed growth in a cultivated, seeded agricultural area which comprises applying to said area prior to the appearance of active vegetative growth an herbicidal composition comprising essentially particles of diatomaceous earth which has been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of the sodium salt of 2,4-dichlorophenoxy acetic acid.

14. A composition according to claim 1 wherein the herbicidal agent is sodium 2,4-dichloro-phenoxyethyl sulfate.

15. A composition for killing growing weeds comprising essentially particles of diatomaceous earth which have been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of sodium 2,4-dichlorophenoxyethyl sulfate.

16. The method of controlling weed growth in a cultivated, seeded agricultural area which comprises applying to said area prior to the appearance of active vegetative growth an herbicidal composition comprising essentially particles of diatomaceous earth which has been calcined at a temperature between about 1200° and about 2000° F. and having a particle size from about —10 mesh to about +30 mesh, said calcined particles being resistant to abrasion, crushing and to slacking when wet by water, said calcined particles being impregnated with 0.1 to 20% by weight of sodium 2,4-dichlorophenoxyethyl sulfate.

References Cited in the file of this patent

UNITED STATES PATENTS

| Number | Name | Date |
|---|---|---|
| 2,523,228 | Mullison | Sept. 19, 1950 |
| 2,604,428 | Macy | July 22, 1952 |

OTHER REFERENCES

Science News Letter, Aug. 2, 1947, page 69.